United States Patent [19]

Johnston

[11] Patent Number: 5,343,308
[45] Date of Patent: Aug. 30, 1994

[54] EXTENDED DYNAMIC RANGE IMAGE DIGITIZING APPARATUS

[75] Inventor: Gregory E. Johnston, Redondo Beach, Calif.

[73] Assignee: X-Ray Scanner Corporation, Torrance, Calif.

[21] Appl. No.: 684,238

[22] Filed: Apr. 12, 1991

[51] Int. Cl.$^5$ .................. H04N 1/40; H04N 1/04; H04N 1/06
[52] U.S. Cl. .................. 358/445; 358/475; 358/487
[58] Field of Search ............... 358/461, 463, 447, 487, 358/406, 445, 475, 209; 378/108

[56] References Cited

U.S. PATENT DOCUMENTS

| | | | |
|---|---|---|---|
| 4,032,784 | 6/1977 | Rich | 378/108 |
| 4,584,606 | 4/1986 | Nagasaki | 358/209 |
| 4,775,799 | 10/1988 | Milch et al. | 358/406 |
| 5,218,485 | 6/1993 | Malm | 359/885 |

Primary Examiner—Curtis Kuntz
Assistant Examiner—P. W. Lee
Attorney, Agent, or Firm—Robert E. Malm

[57] ABSTRACT

The extended dynamic range image digitizing apparatus digitizes image-containing media with dynamic ranges that significantly exceed the dynamic range of the low-cost solid-state light detectors that are customarily used in such equipment. The essence of the invention is the incorporation of controllable light attenuators means in the light path from light source to light detectors thereby permitting the light emerging from an image pixel to be matched to the available dynamic range of the light detector. The pixel light sensed by the detector is controlled in any one of a number of ways. One way is to control the intensity of the light source. A second way which is appropriate for certain types of light detectors is to apply a gating signal to the detector which controls the period of time that the detector is sensitive to incident light. A third way is to interpose an electronic or mechanical shutter mechanism with a controllable open-shutter time in the light path. And finally, a fourth way is to replicate either the light source or detector associated with a particular pixel and interpose fixed different-level light attenuators in the different light paths thereby created.

11 Claims, 3 Drawing Sheets

EXTENDED DYNAMIC RANGE IMAGE DIGITIZING APPARATUS

BACKGROUND OF INVENTION

This invention relates generally to apparatus for converting images recorded in two-dimensional media as variations in either reflectivity or transmissivity into digital data which may be processed by a computer, communicated to another location, or reproduced as visual images that are copies of the original images. More specifically, the invention relates to image digitizing apparatus that can accurately digitize images having extremely wide dynamic ranges.

The apparatus to which the present invention is addressed is of the type where the picture elements ("pixels") constituting the image are imaged either in time sequence on a single light detector or in groups in time sequence on a group of detectors, each pixel in a group being imaged on a particular detector in the detector group on a one-to-one basis. Thus, the apparatus of interest includes pixel-by-pixel scanners, line-by-line scanners, and apparatus in which there is a dedicated detector for each pixel in the image.

The outputs of the light detectors are digitized and translated into reflectivity or transmissivity values after which they are read out to an associated computer for further processing, storage, reproduction as visual copies of the original, or transmission to another location.

Image digitizing apparatus is comprised of a visible light source that illuminates the image to be digitized or a portion thereof, one or more visible light detectors, a lens system that images all or a portion of the pixels that constitute the image on associated light detectors, a transport mechanism for positioning the image containing medium relative to detectors, light source, and lens system (or vice versa) in those situations where portions of the image are read out in time sequence, a time-division multiplexer for assembling the detector data into a serial stream, analog-to-digital circuitry for converting the detector outputs into digital formats, and a digital processor for converting the pixel data into reflectivity or transmissivity values and controlling all of the elements of the digitizing apparatus so that they work properly together.

Inherent device limitations limit the dynamic range of solid-state visible light detectors to less than a few hundred to one while certain types of images involve dynamic ranges that are higher by an order of magnitude or more. Thus, there is a need for image digitizing apparatus that can utilize the low-cost, low-dynamic range solid-state detectors that are currently available and yet realize the high dynamic ranges that are necessary for the precise digital conversion of certain types of imagery.

SUMMARY OF THE INVENTION

The essence of the invention is the incorporation of controllable light attenuation means in the light path from light source to light detectors in image digitizing apparatus thereby permitting the light emerging from an image pixel to be matched to the available dynamic range of the light detector.

The pixel light sensed by the detector is controlled in any one of a number of ways, the choice being based on cost, complexity, and performance considerations. One way is to control the intensity of the light source. A second way which is appropriate for certain types of light detectors is to apply a gating signal to the detector which controls the period of time that the detector is sensitive to incident light. A third way is to interpose an electronic or mechanical shutter mechanism in the light path. And finally, a fourth way is to replicate either the light source or detector associated with a particular pixel and interpose fixed different-level light attenuators in the different light paths thereby created.

The object of the invention is to provide image conversion apparatus with dynamic ranges that exceed the dynamic range of the light detectors used in such equipment by at least an order of magnitude. A further object of the invention is to provide such improved dynamic range apparatus utilizing where possible readily available components so as to realize the improved performance at the lowest possible cost and with minimal impact on reliability.

DESCRIPTION OF THE PREFERRED EMBODIMENT

Figure 1:
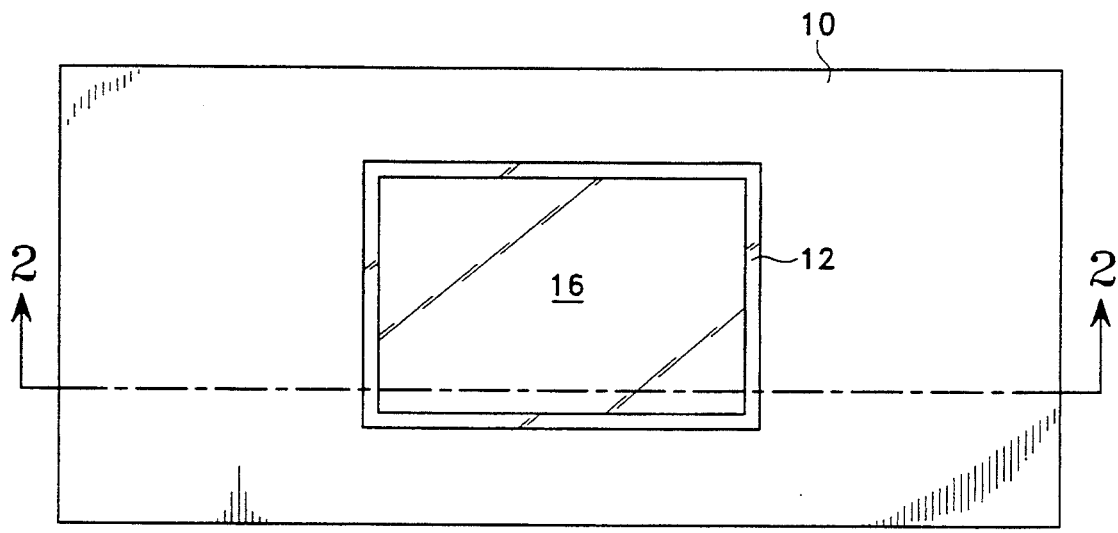
FIG. 1 is a top view of a line-by-line image digitizing apparatus of the type that digitizes the reflectivity of pixels in the image-containing medium.
Figure 2:
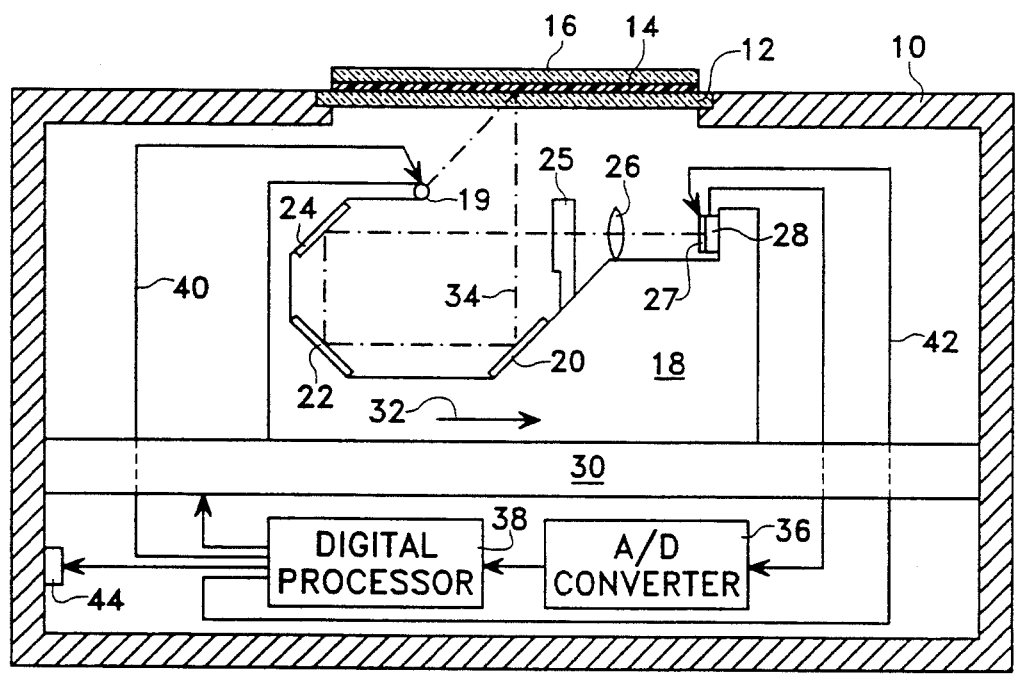
FIG. 2 is a side sectional view taken upon the plane indicated in FIG. 1 showing the interior of the housing of the image digitizing apparatus including the electronics for achieving extended dynamic range.

The extended dynamic range invention as applied to a line-by-line image conversion apparatus is shown in FIG. 1. The housing 10 supports the transparent panel 12 which in turn supports the image-containing medium 14 to be digitized. The platen 16 applies pressure to the image containing medium 14 to assure its close contact with the transparent panel 12.

The imaging assembly platform 18 supports the light source 19, the mirrors 20, 22, and 24, the shutter 25, the lens 26, and the linear detector array 28 and is translatably attached to transport mechanism 30 which is rigidly attached to the housing 10. The motion of the imaging assembly platform 18 is constrained to the one dimension indicated by the arrow 32. The transport mechanism 30 provides the means for precisely positioning the imaging assembly platform 18 relative to the image-containing medium 14.

The imaging process is accomplished by light from light source 19 illuminating at least one line of pixels on the image-containing medium 14, the reflected light from one of the illuminated lines of pixels being directed by the mirrors 20, 22, and 24 to the lens 26 which focuses the light on the linear detector array and multiplexer 28 as indicated by the light ray 34.

The output from the detector array and multiplexer 28 consists of the analog outputs from the detectors in time sequence which are digitized by analog-to-digital convertor 36 and then supplied to the digital processor 38 which stores the data for subsequent processing.

In order to achieve extended dynamic range, the detector array is exposed to the pixel reflected light at a number of different exposure levels. In one implementation the intensity of the light source 19 is successively increased while imaging a particular line of pixels by means of the control signal 40 supplied by the digital processor 38. The collective detector outputs for all of the light intensity levels are utilized by the digital processor in achieving the extended dynamic range of the apparatus.

In another implementation the exposure of the detector array to each line of pixels is successively increased by causing the detector array to be sensitive to incident light for a sequence of increasing periods of time by means of the control signal 42 supplied by the digital processor 38. The collective detector outputs for all of the exposure levels are then utilized in achieving the desired extended dynamic range.

Both light source illumination level and detector array exposure time are jointly adjusted if even greater dynamic ranges are required than can be achieved by the exclusive adjustment of either illumination level or exposure time.

The processed image data from the digital processor 38 is made available to external apparatus by means of connector 44. The digital processor 38 also provides appropriate signals to the transport mechanism 30 thereby properly positioning the imaging assembly platform 18 relative to the image-containing medium 14 as the line-by-line image scanning process proceeds.

In an alternative embodiment, the light source 19, still supported by the imaging assembly platform 18, is placed above the image-containing medium 14 and the platen 16 is transparent. This arrangement permits the transmissivity (rather than the reflectivity) of image-containing media to be digitized.

Figure 3:
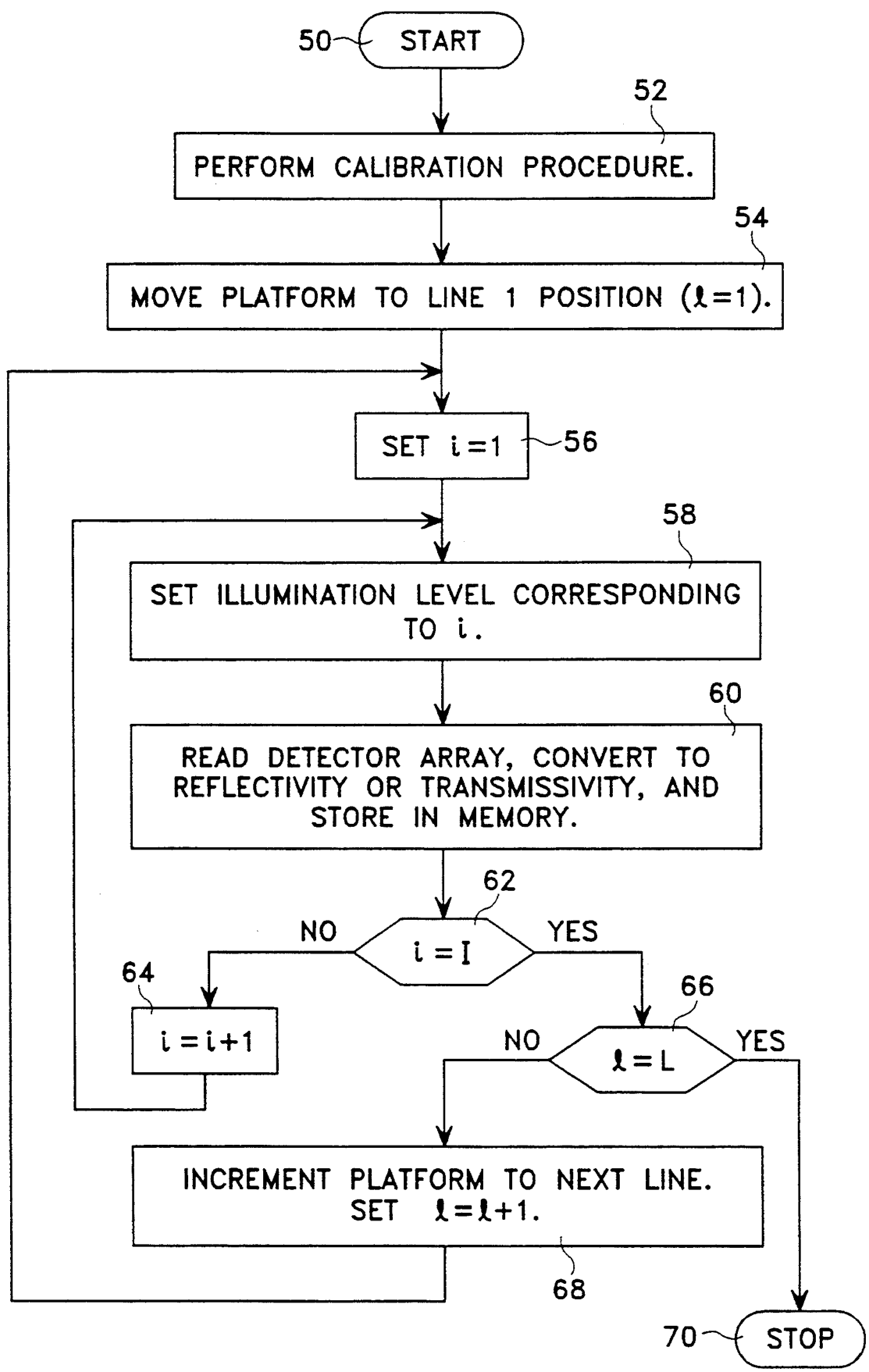
FIG. 3 is a flow diagram which describes the control process performed by the digital processor in gathering the basic image data from which the extended dynamic range image data is obtained.

The operations performed by the digital processor 38 in accumulating the basic image digitizing data are indicated by the flow diagram shown in FIG. 3. A "start" command 50 effected by the operator of the apparatus is followed by the performance 52 of a calibration procedure whereby the responsivities and dark currents of the detectors are established for all light source illumination levels and for all detector exposure times. This calibration data allows the subsequently accumulated raw detector data to be converted to pixel reflectivity or transmissivity values as the situation may require.

The actual gathering of image conversion data begins with the "move transport" command 54 which causes the imaging assembly transport 18 of FIG. 1 to be moved to a position such that line 1 of the image-containing medium is imaged on the detector array. The "illumination level" register is initialized 56 and then appropriate control signal(s) corresponding to the contents of the "illumination level" register are sent 58 to either or both the light source 19 and detector array and multiplexer 28 of FIG. 1.

After positioning of the imaging assembly, the gathering and digitizing 60 of the raw detector data by the digital processor proceeds via the A/D convertor 36 of FIG. 1. Using the calibration data previously obtained, the digital processor then converts the raw detector data into pixel reflectivities for the light source arrangement shown in FIG. 1 or into pixel transmissivities if the light source is positioned above the image-containing medium.

If the determination 62 is made that the final illumination level I has not yet been reached, the "illumination level" register is incremented 64 and the process just described is repeated at the next illumination level. If the final illumination level has been reached, then the determination 66 is made as to whether the last line L of the image-containing medium has been imaged on the detector array. If not, the imaging assembly is advanced to the position of the next line and the "line" register is incremented 68 whereupon the whole process just described is repeated. If the last line of the image-containing medium has been exposed 66 to the detector array, the data gathering process performed by the digital processor ends 70.

Figure 4:
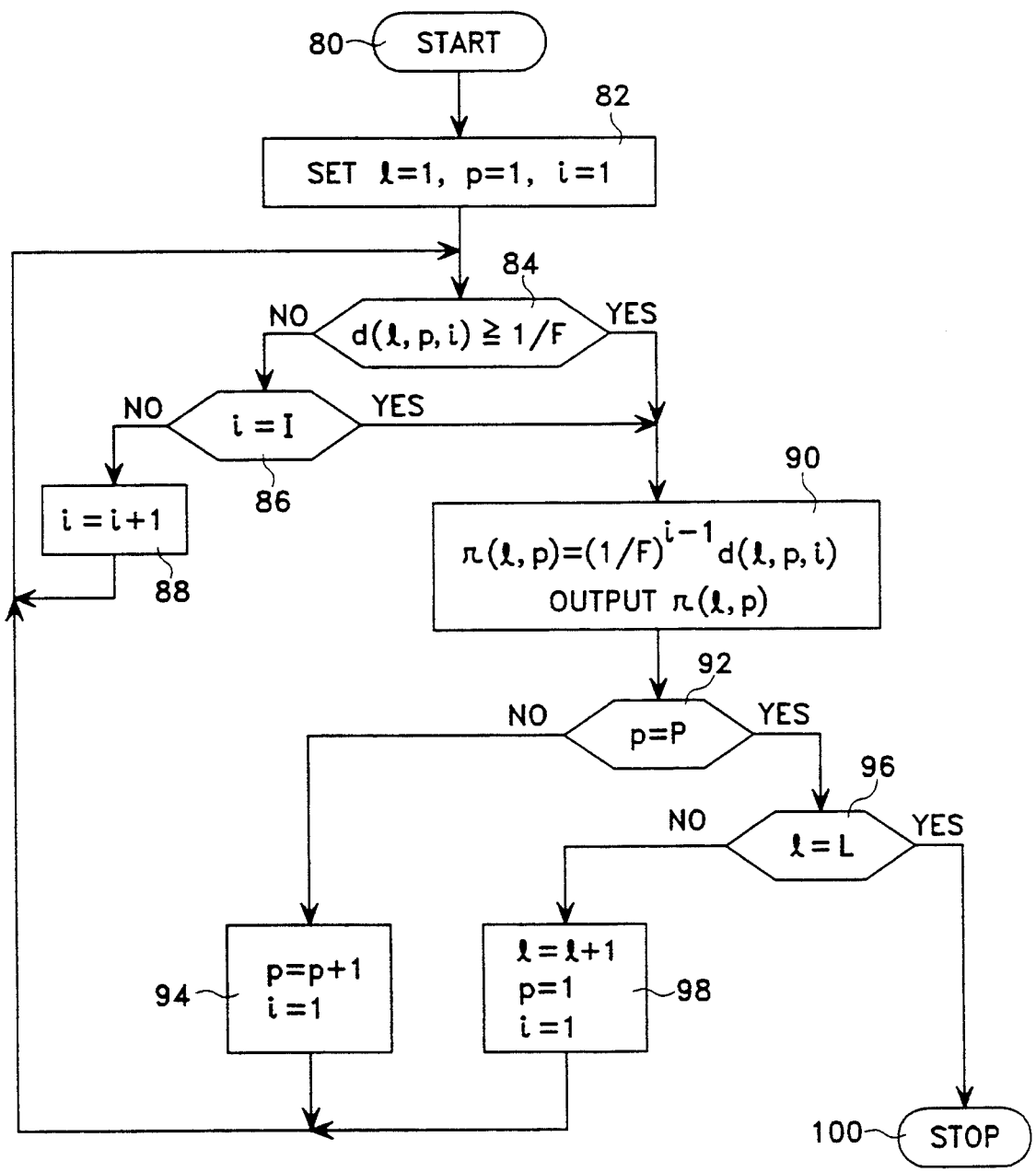
FIG. 4 is a flow diagram which describes the operations performed by the digital processor in obtaining the extended dynamic range image data from the basic image data stored in memory.

The process by which the digital processor converts the basic image conversion data to extended dynamic range data is indicated by the flow diagram shown in FIG. 4. The process is automatically started 80 at the conclusion of the data gathering process shown in FIG. 3.

The "line" (l), "pixel" (p), and "illumination level" (i) registers are initialized 82 and then the determination 84 is made as to whether the reflectivity (or transmissivity) $d(l,p,i)$ of the p'th pixel in the l'th line at the i'th illumination level is greater than or equal to a threshold level $1/F$. If not, and if i does not correspond 86 to the highest illumination level I, i is incremented 88 and the test 84 is repeated.

If $d(l,p,i)$ is greater than the threshold $1/F$ or if i corresponds to the highest illumination level I, then the reflectivity (or transmissivity) is scaled 90 by the factor $(1/F)$ raised to the $(i-1)$'th power to give the extended dynamic range pixel reflectivity/transmissivity $r(l,p)$ which is outputted from the image conversion apparatus to an associated digital computer or other interfacing equipment.

If the last pixel in the line has not yet been processed 92, the "pixel" register is incremented and the "illumination level" register is initialized 94. Then the next pixel is processed beginning with test 84 as described above.

If the last pixel in the line has just been processed 92 and the line is not the last line of the image-containing medium 96, the "line" register is incremented and both the "pixel" and the "illumination level" registers are initialized 98. Then the first pixel of the next line is processed beginning with test 84 as described above.

When the last pixel (p=P) of the last line (l=L) has been processed 92, 96, the digital processor ceases operations 100.

The conceptual basis of the invention is to sequentially expose each detector to the light from its associated pixel at I levels of illumination. For example, by observing a detector's output as the intensity of the illuminating light source or the detector exposure time is increased in steps, the limited dynamic range of the detector can be effectively increased by the number of steps. Although the discussion below will be phrased in terms of increases in illumination, it should be recognized that the same results would accrue if the increases were in detector exposure time or in some combination of the two quantities.

To show mathematically how the invention works, we define the digitized outputs from the detectors as $s(l,p,i)$ where l is the line number, p is the pixel number in the line, and i is the illumination level. It is postulated that the detector outputs are digitized to n bits and that the binary point lies to the extreme left; i.e. $s(l,p,i)$ is less than one.

The first step in the process is to convert the digital detector outputs to corresponding reflectivity or transmissivity values as mentioned earlier. This step corrects for any responsivity differences in the detectors, detector dark currents, and any illumination variations over a line of the image. The results of this step are d(l,p,i) which are also n-bit numbers normalized so that the largest anticipated value does not exceed the binary number 0.111 . . . 1 where the number of ones to the right of the binary point is equal to n.

For any particular level of illumination, only that portion of the detector range that extends from 1/F to one is used. The quantity F is an integer and a design parameter. If at the lowest illumination (i=1) the reflectivity/transmissivity value falls in the range from 1/F to one, this value d(l,p,i=1) is outputted as r(l,p). If, however, the value falls below 1/F, then d(l,p,i=2) is examined which ideally corresponds to an increase in illumination by a factor F. If d(l,p,i=2) now falls in the range from 1/F to one, we output this value multiplied by 1/F (in order to compensate for the increased illumination) as r(l,p). Thus, r(l,p) that derives from d(l,p,i=2) ranges from 1/F2 (1/F raised to the second power) to 1/F thereby joining on to the r(l,p) data that derives from d(l,p,i=1).

A continuation of this process reveals that r(l,p) covers the following ranges depending on the d(l,p,i) from which the quantity derives:

| i | Range of r(l,p) |
|---|---|
| 1 | 1/F to 1 |
| 2 | 1/F∧2 to 1/F |
| 3 | 1/F∧3 to 1/F∧2 |
| . | ... |
| . | ... |
| I | 1/F∧I to 1/F∧(I-1) |

Note that the dynamic range of the r(l,p) data is FI. If, for example, F=8 and I=4, the dynamic range is about four thousand to one.

Although the description of the invention has been in terms of a single threshold value F for all illumination levels, it should be recognized that a different threshold value could be utilized for each illumination level. This option might prove advantageous if there were some hardware difficulty involved in establishing illumination levels with sufficient precision to permit the use of a single threshold value.

It will be recognized by one skilled in the art that there are other equivalent ways of controlling the amount of light reflected from or transmitted through a pixel that falls on a detector besides the direct control of the light source. One option is an electronic or mechanical shutter (25) placed in the light propagation path between pixel and detector which opens for a controlled period of time thereby controlling the light energy that reaches the detector. Another option is to image the light from a pixel on a number of detectors (27) (rather than just one) with different-valued light attenuators placed in front of each detector. The invention described herein is intended to include all of the above variations of the preferred embodiment.

The preferred embodiment of the invention has been described in the context of a line-by-line image digitizing apparatus. It is not intended, however, that the invention be limited to this type of image digitizing apparatus. The techniques described herein are equally applicable to image digitizing apparatus that read out two-dimensional groupings of pixels simultaneously to a corresponding two-dimensional detector array and the invention is intended to include this more general category of image digitizing apparatus.

What is claimed is:

1. An image digitizing apparatus for converting images recorded in two-dimensional media as variations in either reflectivity or transmissivity into digital data, said image digitizing apparatus having an image medium support means capable of holding an image-containing medium composed of a plurality of pixels, each of said pixels being characterized by a transmissivity and a reflectivity, a light source having at least one predetermined light intensity level, said light intensity level being independent of the transmissivity and reflectivity of said image-containing medium pixels, said light source having an input port for receiving a light intensity control signal, said light source being so arranged as to illuminate a portion of said pixels, the illuminated pixels thereby emitting light, a plurality of light detectors having dynamic ranges and having periods of sensitivity to light, the time period during the detector sensitivity periods when light enters said detectors being called exposure time, said light detectors having at least one predetermined sensitivity period duration, said light detectors producing responses to incident light that are functions of the energy of the light entering the detectors during the sensitivity period, said light detectors having input ports for receiving a sensitivity period duration control signal, a lens system that images at least a portion of the emitted light from the illuminated pixels on said light detectors, a transport means for moving said light source, said lens system and said light detectors in an arbitrary direction relative to said image medium support means, said transport means having an input port for receiving control signals that control the motion of said transport means, an analog-to-digital conversion means for converting the responses of said light detectors, and a digital processing means for controlling said apparatus and converting the analog-to-digital converted detector responses into either image reflectivity or transmissivity data, the operations of said digital processing means being controlled by a stored program, said digital processing means supplying to said light source a signal that selects a predetermined light intensity level as specified by the stored program during the execution of the stored program, said digital processing means supplying to said light detectors a signal that selects a predetermined sensitivity period duration as specified by the stored program during the execution of the stored program, the operations performed by said digital processing means in accordance with said stored program resulting in a plurality of responses from each of said detectors for each pixel in said image-containing medium, said responses appearing at the output ports of said detectors, the plurality of responses from each of said detectors resulting from said detectors receiving exposures to the emitted light from said imaged pixels at a plurality of different combinations of intensity levels and sensitivity period durations, at least one of said exposures producing a response from each of said detectors that is within the dynamic range of said detectors, a response that is within the dynamic range of said detectors being called a valid response, said digital processing means obtaining reflectivity/transmissivity data from scaled valid responses, a scaled valid response being a valid response divided by the light energy emitted by said light source during said exposure time.

2. The apparatus of claim 1 wherein said light source has a plurality of predetermined light intensity levels and said light detectors have one predetermined sensitivity period duration.

3. The apparatus of claim 1 wherein said light source has one predetermined light intensity level and said light detectors have a plurality of predetermined sensitivity period durations.

4. The apparatus of claim 1 wherein said light source has a plurality of predetermined light intensity levels and said light detectors have a plurality of predetermined sensitivity period durations.

5. The apparatus of claim 1 further comprising a shutter means interposed between said light source and said detectors for controlling the time duration of exposure of said detectors to pixel emitted light and said digital processing means having an addition to the stored program controlling its operations which causes said detectors to be separately exposed at the same pixel illumination level for a plurality of different open-shutter durations and outputs pixel reflectivity/transmissivity data derived from detector data falling within the detectors' dynamic range.

6. The apparatus of claim 1 wherein said detectors constitute a linear array, said image-containing medium is imaged a line of pixels at a time on said detector array, and said transport means moves said light source, lens system, and detector array a line at a time relative to said support means for said image-containing medium.

7. A process for digitizing images thereby converting images recorded in two-dimensional media as variations in either reflectivity or transmissivity into digital data, an image being comprised of pixels, said pixels emitting light when illuminated, said process comprising the steps:

illuminating each pixel of an image-containing medium at at least one predetermined intensity level, the predetermined intensity level being independent of the transmissivity of the image-containing medium, separately collecting the light emitted from each of the pixels of said image-containing medium at each of said at least one predetermined intensity level, converting the light collected from each of the pixels at each of said at least one predetermined intensity level during at least one predetermined time interval duration into a plurality of electrical signals, the plurality of electrical signals having a common electrical signal parameter that is a function of the collected light energy, the electrical signal parameter being a valid measure of the energy of the collected pixel light if said signal parameter has a value greater than a predetermined minimum value and less than a predetermined maximum value, there being a plurality of electrical signal parameter values obtained for each of the pixels, at least one of said signal parameter values being a valid measure of the collected light energy, selecting those electrical signal parameter values that are valid measures of the collected light energy for conversion to reflectivity/transmissivity values, converting said selected signal parameter values into image-containing medium reflectivity or transmissivity values, depending respectively on whether said emitted light from said pixels is reflected from or transmitted through said image-containing medium.

8. The process of claim 7 wherein the illuminating step is performed at a plurality of predetermined intensity levels and the converting step is performed at a single predetermined time interval value.

9. The process of claim 7 wherein the illuminating step is performed at a single predetermined intensity level and the converting step is performed at a plurality of predetermined time interval values.

10. An apparatus for practicing a process for digitizing images thereby converting images recorded in two-dimensional media as variations in either reflectivity or transmissivity into digital data, an image being comprised of pixels, said pixels emitting light when illuminated, said apparatus comprising:

means for illuminating each pixel of the image-containing medium at at least one predetermined intensity level, the predetermined intensity level being independent of the transmissivity of the image-containing medium, means for separately collecting the light emitted from each of the pixels of said image-containing medium at each of said at least one predetermined intensity levels, means for converting the light collected from each of the pixels at each of said at least one predetermined intensity levels during at least one predetermined time interval duration into a plurality of electrical signals, the plurality of electrical signals having a common electrical signal parameter that is a function of the collected light energy, the electrical signal parameter being a valid measure of the energy of the collected pixel light if said signal parameter has a value greater than a predetermined minimum value and less than a predetermined maximum value, there being a plurality of electrical signal parameter values obtained for each of the pixels, at least one of said signal parameter values being a valid measure of the collected light energy, mean for selecting those electrical signal parameter values that are valid measures of the collected light energy for conversion to reflectivity/transmissivity values, mean for converting said selected signal parameter values into image-containing medium reflectivity or transmissivity values, depending respectively on whether said emitted light from said pixels is reflected from or transmitted through said image-containing medium.

11. An image digitizing apparatus for converting images recorded in two-dimensional media as variations in either reflectivity or transmissivity into digital data, said image digitizing apparatus comprising an image medium support means holding an image-containing medium composed of a plurality of pixels, each of said pixels being characterized by a transmissivity and a reflectivity, a light source having a predetermined light intensity level, said light intensity level being independent of the transmissivity and reflectivity of said image-containing medium pixels, said light source being arranged as to illuminate at least one of said pixels, each of the illuminated pixels thereby emitting light, a group of light-attenuating light detectors for each of said illuminated pixels, each of said light-attenuating detectors comprising a light detector in combination with a light-attenuating layer whereby light entering a light-attenuating detector is attenuated by a predetermined amount in passing through its light-attenuating layer prior to reaching the light detector, each of said light-attenuating detectors in a group of light-attenuating detectors associated with the illuminated pixel having a different attenuation, said light-attenuating detectors having dynamic ranges and a predetermined sensitivity period and producing responses to incident light that are functions of the energy of the light entering the light detectors during the sensitivity period, a lens system that images a portion of the emitted light from the illuminated pixel on each light-attenuating detector of the group of light-attenuating detectors associated with said illuminated pixel, transport means for moving said light source, said lens system and said light-attenuating detectors in an arbitrary direction relative to said image medium support means, said transport means having an input port for receiving control signals that control the motion of said transport means, an analog-to-digital conversion means for converting the responses of said light-attenuating detectors, and a digital processing means for controlling said apparatus and converting the analog-to-digital converted detector responses into either image reflectivity or transmissivity data, the operations of said digital processing means being controlled by a stored program, the operations performed by said digital processing means, in accordance with said stored program, resulting in a response from each light-attenuating detector in the group of light-attenuating detectors associated with each pixel in said image-containing medium, said response from each light-attenuating detector in the group of light-attenuating detectors appearing at a corresponding output port of said light-attenuating detector, at least one of the light-attenuating detectors in the group of light-attenuating detectors associated with the illuminated pixel producing a response that is within the dynamic range of said detectors, a response that is within the dynamic range of said light detectors being called a valid response, said digital processing means obtaining reflectivity/transmissivity data from said valid responses.

* * * * *